US012674984B2

(12) United States Patent
Maric et al.

(10) Patent No.: US 12,674,984 B2
(45) Date of Patent: Jul. 7, 2026

(54) HEAD-MOUNTABLE DEVICES WITH CONNECTABLE LENS ASSEMBLIES

(71) Applicant: Apple Inc., Cupertino, CA (US)

(72) Inventors: Ivan S. Maric, San Francisco, CA (US); Darshan R. Kasar, San Francisco, CA (US); Forrest C. Wang, Petaluma, CA (US); Junhan Ren, San Diego, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 18/570,051

(22) PCT Filed: Jun. 14, 2022

(86) PCT No.: PCT/US2022/033449
§ 371 (c)(1),
(2) Date: Dec. 13, 2023

(87) PCT Pub. No.: WO2022/266110
PCT Pub. Date: Dec. 22, 2022

(65) Prior Publication Data
US 2024/0280818 A1 Aug. 22, 2024

Related U.S. Application Data

(60) Provisional application No. 63/211,436, filed on Jun. 16, 2021.

(51) Int. Cl.
*G02B 27/01* (2006.01)

(52) U.S. Cl.
CPC ..... *G02B 27/0172* (2013.01); *G02B 27/0176* (2013.01); *G02B 2027/0138* (2013.01)

(58) Field of Classification Search
CPC ............ G02B 27/0172; G02B 27/0176; G02B 2027/0138
(Continued)

(56) References Cited

U.S. PATENT DOCUMENTS

2017/0364144 A1* 12/2017 Petrov ................ G02B 27/0093
2018/0157043 A1 6/2018 Yi et al.
2019/0028697 A1 1/2019 Sullivan et al.

FOREIGN PATENT DOCUMENTS

CN 108333759 A 7/2018
CN 112513715 A 3/2021
(Continued)

OTHER PUBLICATIONS

International Search Report and Written Opinion from PCT/US2022/033449, dated Oct. 5, 2022, 11 pages.
(Continued)

*Primary Examiner* — William Choi
(74) *Attorney, Agent, or Firm* — BAKERHOSTETLER

(57) ABSTRACT
A head-mountable device can include modules that provide vision correction and operable connections between the modules. By providing head-mountable devices with modular features, certain lens assemblies can provide the desired vision correction for any given user and facilitate exchange with a different lens assembly for a different user. The lens assembly can identify itself and/or a feature thereof (e.g., vision correction and/or user identification) via an operable connection through the optical assembly onto which it attaches. By providing the operable connection through the optical assembly, part count, weight, complexity, and install procedures can be reduced. By sealing the cable providing the operable connect from an external environment, the reliability and robustness of the connection can be enhanced.

19 Claims, 8 Drawing Sheets

(58) Field of Classification Search
USPC .......................................... 359/630; 345/7–9
See application file for complete search history.

(56) References Cited

FOREIGN PATENT DOCUMENTS

| CN | 112673301 A | 4/2021 |
| WO | WO 2021/021155 | 2/2021 |

OTHER PUBLICATIONS

Chinese Patent Application No. 2022800431749, First Office Action dated Apr. 24, 2026, 16 pages, with English translation.

* cited by examiner

700

702 — DETECT LENS ASSEMBLY

704 — RETRIEVE INFORMATION

706 — DETERMINE OUTPUT

708 — CONTROL OUTPUT OF DISPLAY

HEAD-MOUNTABLE DEVICES WITH CONNECTABLE LENS ASSEMBLIES

CROSS-REFERENCE TO RELATED APPLICATION

This application claims the benefit of U.S. Provisional Application No. 63/211,436, entitled "HEAD-MOUNT-ABLE DEVICES WITH CONNECTABLE LENS MOD-ULES," filed Jun. 16, 2021, the entirety of which is hereby incorporated herein by reference.

TECHNICAL FIELD

The present description relates generally to head-mountable devices, and, more particularly, to head-mountable devices with connectable lens assemblies.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
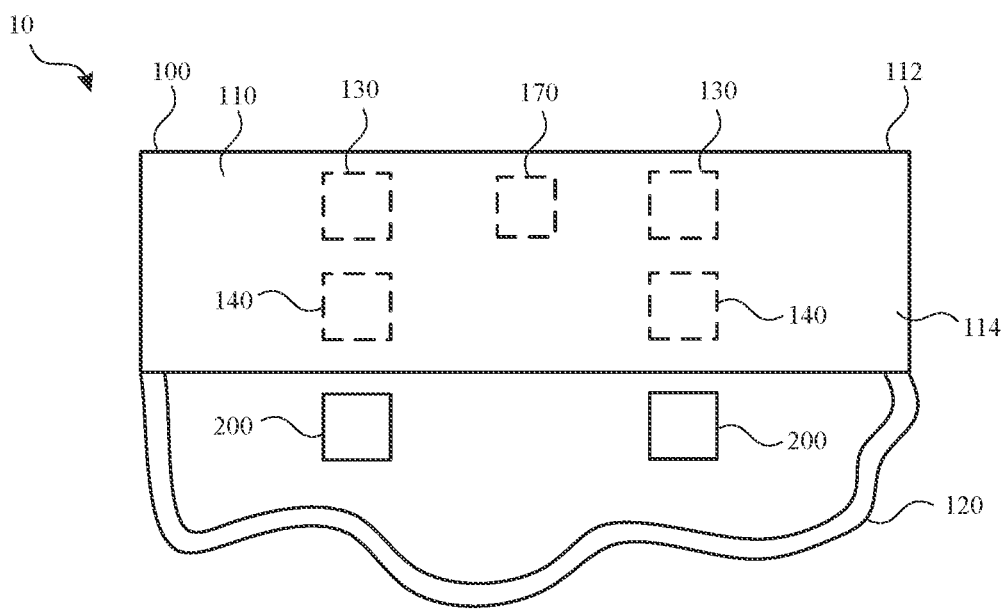
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the output is tailored to the needs of the user wearing the head-mountable device. In particular, the visual output features of a head-mountable device can be provided in a manner that accommodates a user's vision, including vision deficiencies and/or needs for vision correction. For example, a head-mountable device can include or be combinable with corrective lenses that allow a user to properly view the visual output features of the head-mountable device. To allow a given head-mount-able device can be used by different users, the corrective lenses can be provided as a separate module that is attach-able, removable, and/or exchangeable with other corrective lenses. Accordingly, any given user can properly view the visual output features when using the head-mountable device with an appropriate corresponding set of corrective lenses.

Systems, devices, and methods of the present disclosure can provide a head-mountable device with modules that provide vision correction and operable connections between the modules. By providing head-mountable devices with modular features, certain lens assemblies can provide the desired vision correction for any given user and facilitate exchange with a different lens assembly for a different user. The lens assembly can identify itself and/or a feature thereof (e.g., vision correction and/or user identification) via an operable connection through the optical assembly onto which it attaches. By providing the operable connection through the optical assembly, part count, weight, complexity, and install procedures can be reduced. By sealing the cable providing the operable connect from an external environment, the reliability and robustness of the connection can be enhanced.

These and other embodiments are discussed below with reference to FIGS. 1-14. However, those skilled in the art will readily appreciate that the detailed description given herein with respect to these Figures is for explanatory purposes only and should not be construed as limiting.

According to some embodiments, for example as shown in FIG. 1, a head-mountable device 10 includes an HMD assembly 100 with a frame 110 that is worn on a head of a user. The frame 110 can be positioned in front of the eyes of a user to provide information within a field of view of the user. The HMD assembly 100 can provide nose pads or another feature to rest on a user's nose and/or engage other parts of the user's face.

The frame 110 can be supported on a user's head with the head engager 120. The head engager 120 can wrap or extend along opposing sides of a user's head. The head engager 120 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, the head engager 120 can include multiple components to engage a user's head.

The frame 110 can provide structure around a peripheral region thereof to support any internal components of the HMD assembly 100 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the head engager 120 of the head-mountable device 10.

The frame 110 can include and/or support one or more camera 130. The cameras 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 10 can include optical assemblies 140 that provide visual output for viewing by a user wearing the head-mountable device 10. One or more optical assemblies 140 can be positioned on or near an inner side 114 of the frame 110. As used herein, an inner side 114 of a portion of a head-mountable device is a side that faces toward the user and/or away from the external environment. An optical assembly 140 can transmit light from a physical environment (e.g., as captured by a camera) for viewing by the user. Such an optical assembly 140 can include optical properties, such as lenses for vision correction based on incoming light from the physical environment. Additionally or alternatively, an optical assembly 140 can provide information as a display within a field of view of the user. Such information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

Referring again to FIG. 1, the head-mountable device can include one or more lens assemblies 200. The lens assembly 200 can be or include one or more lenses for providing corrective vision capabilities. It will be understood that, where multiple lenses are used, the lenses of the lens assembly 200 can be provided together or separately (e.g., for combination). One lens assembly 200 can be applied to each of multiple (e.g., two) optical assemblies 140, as described further herein.

Figure 2:
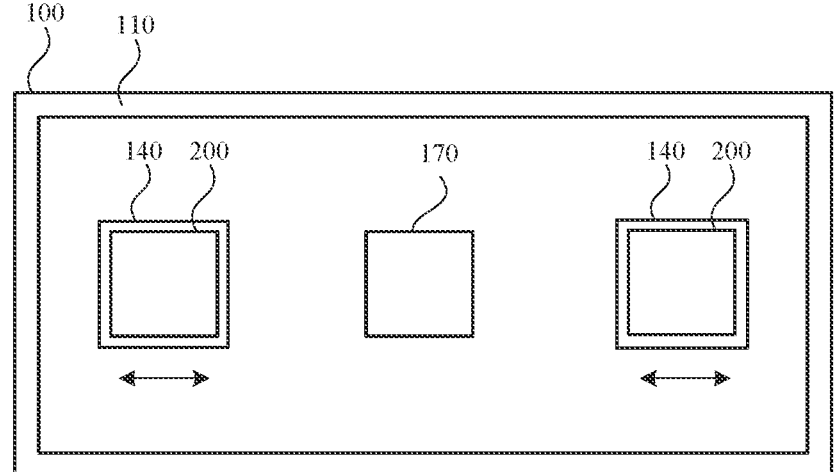
FIG. 2 illustrates a rear view of the head-mountable device of FIG. 1, according to some embodiments of the present disclosure.

Referring now to FIG. 2, the optical assemblies of the head-mountable device can be adjustable to accommodate the facial features of the user wearing the head-mountable device and align each optical assembly with a corresponding eye of the user.

As shown in FIG. 2, the frame 110 can support a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like.

As further shown in FIG. 2, each optical assembly 140 can be adjusted to align with a corresponding eye of the user. For example, each optical assembly 140 can be moved along one or more axes until a center of each optical assembly 140 is aligned with a center of the corresponding eye. Accordingly, the distance between the optical assemblies 140 can be set based on an interpupillary distance ("IPD") of the user. IPD is defined as the distance between the centers of the pupils of a user's eyes.

The pair of optical assemblies 140 can be mounted to the frame 110 and separated by a distance. The distance between the pair of optical assemblies 140 can be designed to correspond to the IPD of a user. The distance can be adjustable to account for different IPDs of different users that may wear the head-mountable device 10. For example, either or both of the optical assemblies 140 may be movably mounted to the frame 110 to permit the optical assemblies 140 to move or translate laterally to make the distance larger or smaller. Any type of manual or automatic mechanism may be used to permit the distance between the optical assemblies 140 to be an adjustable distance. For example, the optical assemblies 140 can be mounted to the frame 110 via slidable tracks or guides that permit manual or electronically actuated movement of one or more of the optical assemblies 140 to adjust the distance there between.

Additionally or alternatively, the optical assemblies 140 can be moved to a target location based on a desired visual effect that corresponds to user's perception of the optical assembly 140 when it is positioned at the target location. The target location can be determined based on a focal length of the user and/or optical elements of the system. For example, the user's eye and/or optical elements of the system can determine how the visual output of the optical assembly 140 will be perceived by the user. The distance between the optical assembly 140 and the user's eye and/or the distance between the optical assembly 140 and one or more optical elements can be altered to place the optical assembly 140 at, within, or outside of a corresponding focal distance. Such adjustments can be useful to accommodate a particular user's eye, corrective lenses, and/or a desired optical effect.

Figure 3:
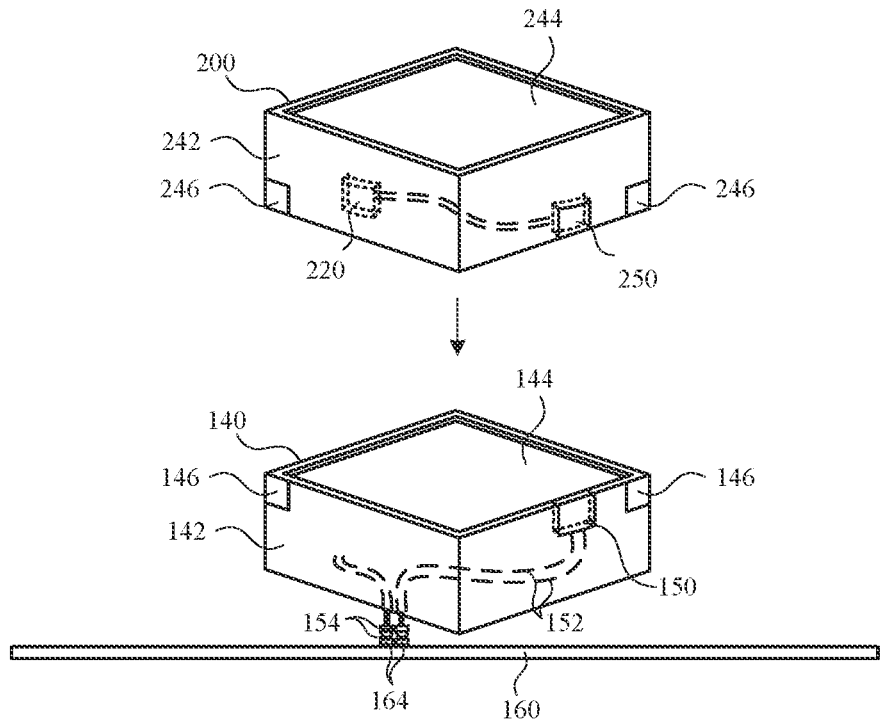
FIG. 3 illustrates an exploded perspective view of a lens assembly and an optical assembly of the head-mountable device of FIG. 1, according to some embodiments of the present disclosure.
Figure 4:
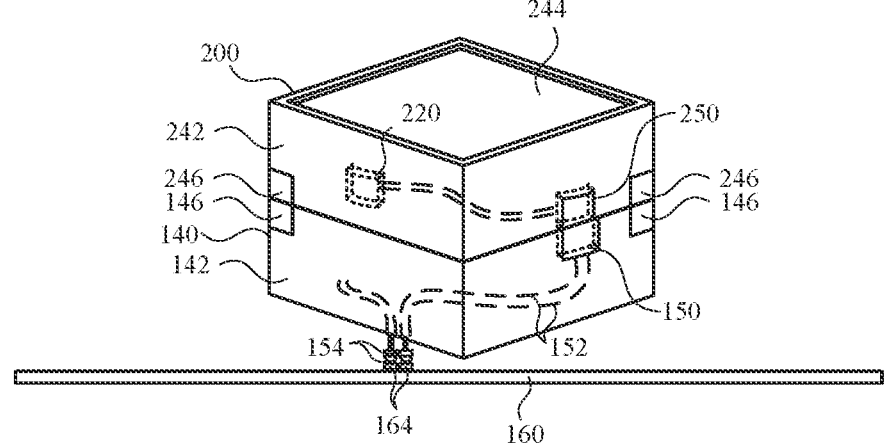
FIG. 4 illustrates a perspective view of the lens assembly and the optical assembly of FIG. 3, according to some embodiments of the present disclosure.

Referring now to FIGS. 3 and 4, a lens assembly can be coupled to an optical assembly, and the optical assembly can provide an operable connection between the lens assembly and a control board of the head-mountable device.

As used herein, "modular" or "module" can refer to a characteristic that allows an item, such as a lens assembly, to be connected, installed, removed, swapped, and/or exchanged by a user in conjunction with another item, such as an optical assembly of a head-mounted device. Connection of a lens assembly with an optical assembly can be performed and reversed, followed by disconnection and connection of another lens assembly with the same optical assembly or another optical assembly with the same lens assembly. As such, multiple lens assemblies can be exchangeable with each other with respect to a given optical assembly. Further, multiple optical assemblies can be used with any given lens assembly.

A lens assembly can be connected to an optical assembly in a manner that allows the lens assembly to be removed thereafter. The connection can be fully reversible, such that when the lens assembly and the optical assembly are disconnected, each is restored to a condition held prior to the connection. The connection can be fully repeatable, such that after the lens assembly and the optical assembly are disconnected, the same or a different optical assembly and lens assembly pair can be connected in the same way.

A lens assembly and an optical assembly can be connected in a manner that secures the relative positions of the lens assembly and the optical assembly with respect to each other. The lens assembly and the optical assembly can be connected in a manner that provides a communication link there between. The secured positions and the communication link can both be achieved and maintained upon connection of the lens assembly and the optical assembly. The secured positions and the communication link can both be removed upon disconnection of the lens assembly from the optical assembly.

As shown in FIG. 3, each optical assembly 140 can include a display 144 within an optical assembly housing 142. The optical assembly housing 142 can surround an outer periphery of the display 144 and provide support thereto. Additionally, the optical assembly housing 142 can define at least a portion of a periphery of the optical assembly 140.

The display 144 of the optical assembly 140 can be operated to display visual information for a user. For example, the display 144 can provide visual (e.g., image or video) output by utilizing, for example, digital light projection, OLEDs, LEDS, uLEDs, liquid crystal on silicon, laser scanning light source, or any combination of these technologies.

Operation of the display 144 can be controlled by a control board 160. The control board 160 can be operably connected to the display 144 of the optical assembly 140 by one or more of a variety to connections. For example, one or more outer optical assembly connectors 154 can include an element for making an electrical connection, such as a pogo pin that is at least partially collapsible and/or a contact pad provide by the control board connector 164 of the control board 160. By further example, a pogo pin of the outer optical assembly connector 154 can be spring loaded and/or a contact pad of the control board connector 164 can be formed from an electrically conductive foam or elastomer. It will be understood that the arrangement of parts can be altered, for example with a pogo pin extending from the control board 160 and/or a contact pad positioned at the outer optical assembly connector 154 of the optical assembly 140.

As further shown in FIG. 3, each lens assembly 200 can include a lens 244 within a lens assembly housing 242. The lens assembly housing 242 can surround an outer periphery of the lens 244 and provide support thereto. Additionally, the lens assembly housing 242 can define at least a portion of a periphery of the lens assembly 200.

The lens 244 can provide one or more types of optical effects and/or vision correction. Lenses 244 can include other optical components as required to produce a desired optical effect. For example, lenses 244 can provide vision correction to light as appropriate for a given user. Such correction can be spherical, aspheric, atoric, cylindrical, single vision, multifocal, progressive, and/or adjustable. By further example, lenses 244 can include one or more diffusers, filters, polarizers, prisms, beam splitters, diffraction gratings, mirrors, and/or windows. The differences in correction or other effects among lenses 244 of different lens assemblies 200 can include variations in type of correction, diopter power, axis of correction, and the like. Various combinations of corrections can be provided with different lens assemblies 200. Accordingly, different users can use different lens assemblies 200 and/or no lens assembly 200 as desired.

The lens assembly 200 can include one or more lens assembly engagers 246 (e.g., magnets) supported by the lens assembly housing 242, and the optical assembly 140 can include one or more optical assembly engagers 146 (e.g., magnets) supported by the optical assembly housing 142. The lens assembly engagers 246 and the optical assembly engagers 146 can facilitate coupling of the lens assembly 200 to the optical assembly 140 in a relative position and orientation that aligns the lens 244 of the lens assembly 200 in a preferred position and orientation relative to the display 144 of the optical assembly 140. For example, the lens assembly engagers 246 can releasably engage optical assembly engagers 146 of the optical assembly 140 to couple the lens assembly 200 to the optical assembly 140. It will be understood that such placement can allow the lens assembly 200 to be securely held in any location that places the lens 244 within a field of view of the user and/or between the user and the display 144 of the optical assembly 140.

One or more of various engagers can be provided to secure the modules to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included to couple and/or secure the modules together. The modules can remain secured to each other until an optional release mechanism is actuated. The release mechanism can be provided for access by a user.

The lens assembly 200 can be an electronic lens assembly. For example, an electronic lens assembly 200 can include an electronic component 220 that provides one or more functions to the head-mountable device by controlling and/or directing an electric current. Non-limiting examples of an electronic component 220 include a sensor, an antenna, a light emitter, a memory, a processor, and the like. The electronic component 220 can provide such functions to the head-mountable device when the electronic lens assembly 200 is coupled to the optical assembly 140, as described further herein. The electronic component 220 can be operably connected to the head-mountable device (e.g., the control board 160) by the optical assembly 140.

For example, the electronic component 220 can be operably connected to a lens assembly connector 250 of the electronic lens assembly 200. The lens assembly connector 250 can be on an outer side of the electronic lens assembly 200 that faces the optical assembly 140 when connected thereto. By further example, the optical assembly 140 can include an inner optical assembly connector 150. The inner optical assembly connector 150 can be on an inner side of the optical assembly 140 (e.g., facing the user when worn). The lens assembly connector 250 and the inner optical assembly connector 150 can each provide a communication interface. The communication interfaces can include one or more conductive contacts (e.g., electrodes) that are configured to make electrical contact with another conductive contacts (e.g., electrodes) when the electronic lens assembly 200 is coupled to the optical assembly 140 (e.g., by the optical assembly engagers 146 and the lens assembly engagers 246). Additionally or alternatively, the connectors can include communication interfaces that are manually connected to establish a communication interface. Such connectors can include ZIF connectors, non-ZIF connectors, slider connectors, flip actuator connectors, and/or FPC-to-Board connectors. In some examples, the communication interfaces can be separate and independent of the engagers. Optionally, the communication interfaces can be connected when the engagers are coupled together. Additionally or alternatively, the communication interfaces can be integrated into the corresponding engagers.

One or more of the outer optical assembly connectors 154 can be operably connected to the inner optical assembly connector 150 by one or more cables 152. The one or more cables 152 can be contained within the optical assembly housing 142 of the optical assembly 140. Accordingly, the one or more cables 152 can be sealed and separate from an external environment, such that the one or more cables 152 are protected from exposure to the external environment. For examples, the one or more cables 152 can be surrounded on all sides thereof by the optical assembly housing 142. The optical assembly housing 142 can be formed (e.g., molded) about the entirety of the one or more cables 152. The one or more cables 152 can optionally include one or more other layers, such as insulating coatings. The one or more cables 152 can terminate at ends thereof at the inner optical assembly connector 150 and the outer optical assembly connector 154. Each of the inner optical assembly connector 150 and the outer optical assembly connector 154 can provide corresponding communication interfaces to provide operable connections.

Accordingly, the electronic component 220 of the electronic lens assembly 200 can be operably connected to the control board 160 and/or other components of the head-mountable device through the lens assembly connector 250, the inner optical assembly connector 150, the one or more cables 152, the outer optical assembly connector 154, and/or the control board connector 164. It will be understood that other connectors can be provided and/or one or more of the connectors described herein can be consolidated into an integrated connection.

The electronic component 220 can provide one or more functions to the head-mountable device when the electronic lens assembly 200 is coupled to the optical assembly 140, as described herein. In some examples, the electronic component 220 can provide identification information corresponding to the electronic lens assembly 200 and/or the user. For example, a lens 244 of any given electronic lens assembly 200 can provide a known type of vision correction based on the identity thereof. Such a lens 244 can be selected for a user based on an eye exam, prescription, and/or selection by a user. Corresponding indicators, such as stock keeping units ("SKU"), can be assigned for reference and to facilitate selection of an electronic lens assembly 200 for a given user. Information corresponding to the type of lens can be stored on the electronic component 220 of the electronic lens assembly 200. For example, the electronic component 220 can include a memory or other storage device. The information stored on the electronic component 220 can include an indicator (e.g., SKU) corresponding to the lens 244, a type of vision correction provided by the lens 244, and/or other information that can be used by the head-mountable device. For example, the head-mountable device may alter the output of the display based on the determined lens being used at any given time.

Additionally or alternatively, the electronic component 220 can contain information corresponding to a user to whom the electronic lens assembly 200 belongs. For example, different users can require different vision correction and/or no vision correction. Accordingly, different lens assemblies 200 can be exchangeably coupled as needed based on which user is wearing a head-mountable device at any given time. Particular lenses can be correlated to particular users, such that the head-mountable device can determine which user is wearing a head-mountable device based on the information provided by the electronic component 220. For example, the head-mountable device may alter the output of the display and/or other operations thereof based on the determined user to match the user's preselected preferences and/or settings. Accordingly, the operation of the head-mountable device can be custom tailored to a given user based on the receipt of information from the electronic component 220.

In some embodiments, the electronic component 220 can be or include a sensor or other input device. Such a sensor can perform detections and/or take measurements from the location of the electronic lens assembly 200 (e.g., between the optical assembly 140 and the face of the user).

The electronic component 220 can include a user sensor. At such the location of the lens assembly, such sensors can be relatively close to the face of the user to obtain detailed measurements. For example, the electronic component 220 can include a proximity sensor to detect a distance to the face of the user. By further example, the electronic component 220 can include a sensor to perform facial feature detection, facial movement detection, facial recognition, eye tracking, user mood detection, user emotion detection, voice detection, etc.

The electronic component 220 can include an environmental sensor. At such the location of the lens assembly, conditions within a space or chamber of the head-mountable device can be determined. Such conditions can be meaningful as they represent conditions to which the face of the user is exposed while the user is wearing the head-mountable device. For example, the electronic component 220 can include a thermal (e.g., temperature) and/or humidity sensor to detect temperature and/or humidity at the region adjacent to the user's face. By further example, the electronic component 220 can include an ambient light sensor to detect whether light from an external environment has penetrated into the space between the head-mountable device and the face of the user.

The electronic component 220 can include an HMD sensor, such as inertial measurement unit ("IMU"), a magnetometer, a gyroscope, an accelerometer, a global positioning sensor, a tilt sensor, and the like to determine a condition of the electronic lens assembly 200 (e.g., with respect to optical assembly 140, etc.). Such sensors can be configured to sense substantially any type of characteristic such as, but not limited to, images, pressure, light, touch, force, temperature, position, motion, and so on. Where applicable, the detected conditions can be correlated to the user and/or the head-mountable device when the lens assembly is coupled to the optical assembly and/or the head-mountable device is worn by the user.

In some embodiments, the electronic component 220 can be an output device. For example, the electronic component 220 can include a light emitting device that provides notifications or other information that is visually detectable by the user. By further example, the output device can provide other outputs near the face of the user.

In some embodiments, the electronic component 220 can include operable components, such as an antenna, an NFC tag, a cooling device, a heating device, or other component that can be actively operated by the head-mountable device when the electronic lens assembly 200 is coupled to the optical assembly 140.

Referring now to FIGS. 5-10, one or more optical assembly connectors and/or lens assembly connectors can include electrical contacts for providing operable connections between an optical assembly and a lens assembly.

Figure 5:
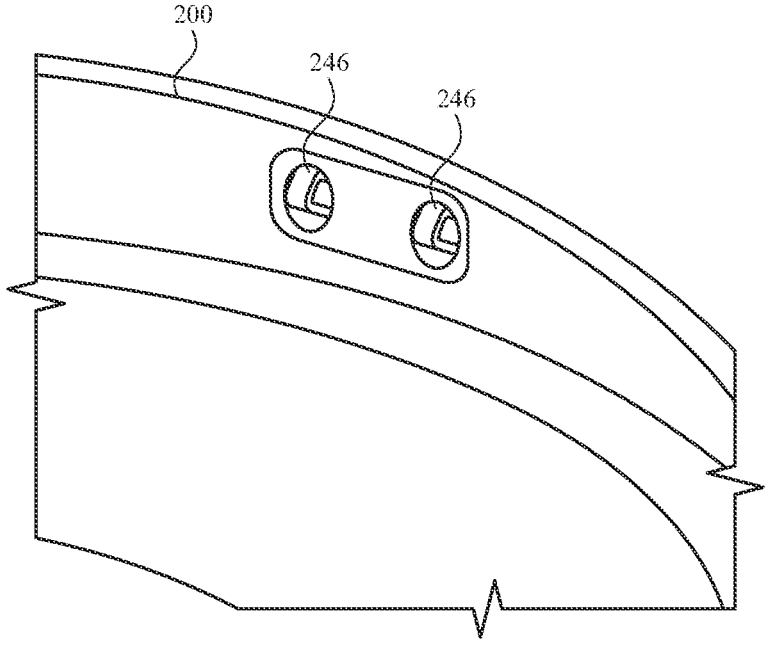
FIG. 5 illustrates a perspective view of a portion of a lens assembly of head-mountable device, according to some embodiments of the present disclosure.
Figure 6:
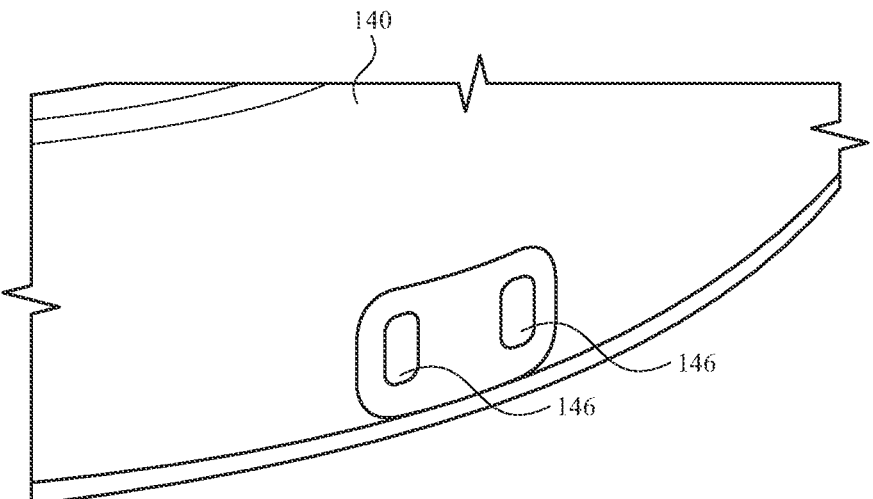
FIG. 6 illustrates a perspective view of a portion of an optical assembly of head-mountable device, according to some embodiments of the present disclosure.

As shown in FIG. 5, the electronic lens assembly 200 can provide one or more lens assembly connectors 250 that protrude radially inwardly or radially outwardly from a lens assembly housing to provide a surface for contacting another connector. The protrusion can be spring biased, such that the lens assembly connectors 250 can retract as needed while applying an opposing force for enhanced engagement. For example, as shown in FIG. 6, the optical assembly can provide one or more optical assembly connectors 150 that face radially outwardly or radially inwardly from an optical assembly housing to provide a surface for contacting and/or being contacted by the one or more lens assembly connectors 250. By providing surfaces that oppose each other while facing radially inwardly and radially outwardly, the surfaces of the connectors can be wiped with relatively transverse motion during connection and disconnection. This can help maintain the cleanliness of the surfaces.

Figure 7:
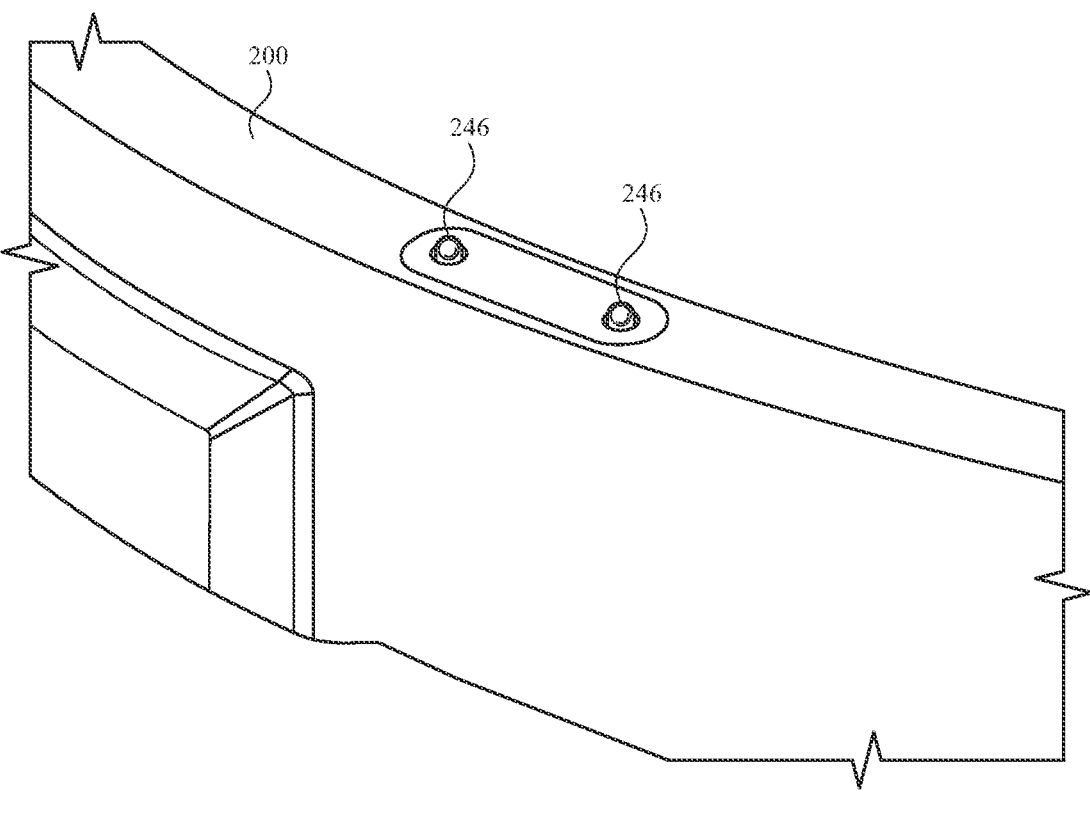
FIG. 7 illustrates a perspective view of a portion of a lens assembly of head-mountable device, according to some embodiments of the present disclosure.
Figure 8:
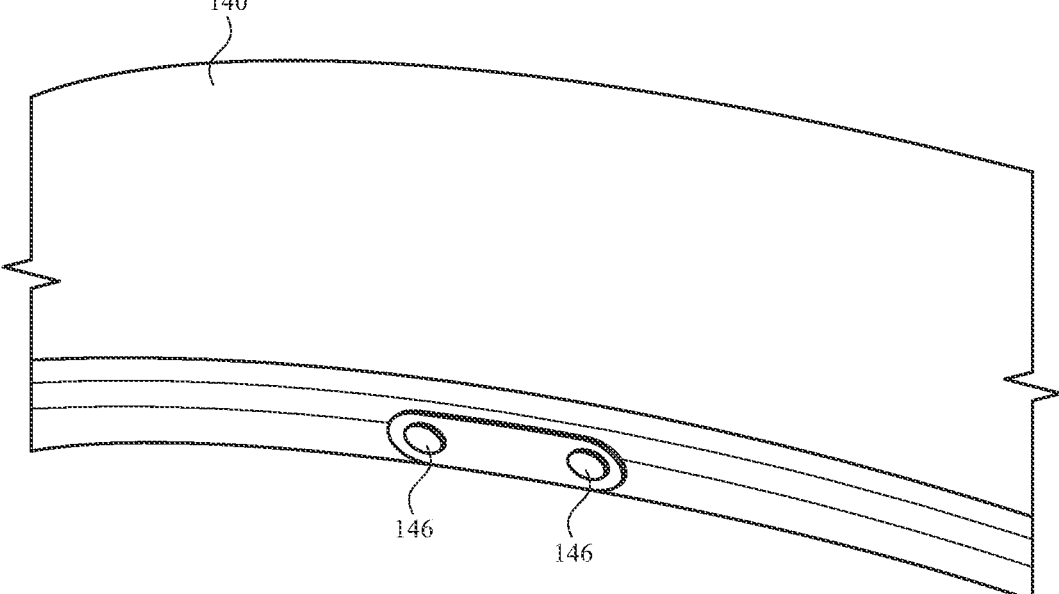
FIG. 8 illustrates a perspective view of a portion of an optical assembly of head-mountable device, according to some embodiments of the present disclosure.

As shown in FIG. 7, the electronic lens assembly 200 can provide one or more lens assembly connectors 250 that protrude axially outwardly from a lens assembly housing to provide a surface for contacting another connector. The protrusion (e.g., pogo pins) can be spring biased, such that the lens assembly connectors 250 can retract as needed while applying an opposing force for enhanced engagement. For example, as shown in FIG. 8, the optical assembly can provide one or more optical assembly connectors 150 that face axially from an optical assembly housing to provide a surface for contacting and/or being contacted by the one or more lens assembly connectors 250. By providing surfaces that oppose each other while facing axially, the surfaces of the connectors can be pressed against each other upon connection in an axial direction.

Figure 9:
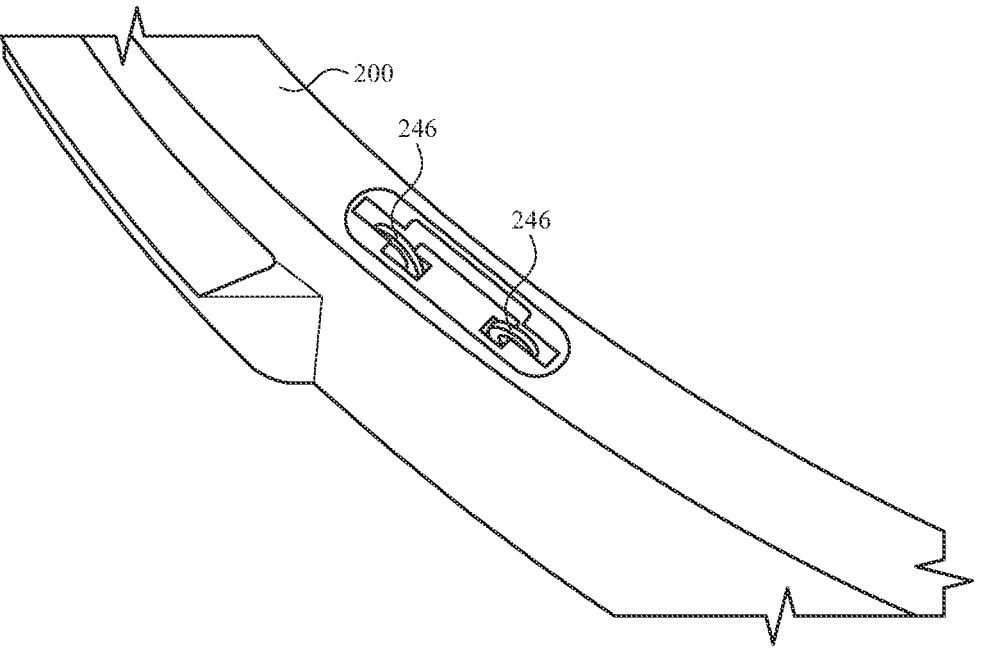
FIG. 9 illustrates a perspective view of a portion of a lens assembly of head-mountable device, according to some embodiments of the present disclosure.
Figure 10:
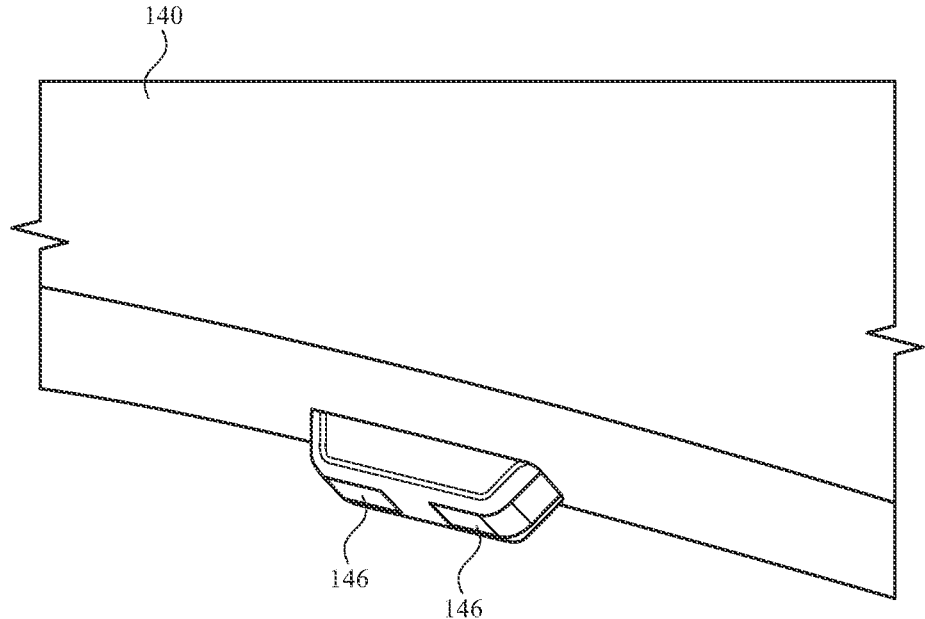
FIG. 10 illustrates a perspective view of a portion of an optical assembly of head-mountable device, according to some embodiments of the present disclosure.

As shown in FIG. 9, the electronic lens assembly 200 can provide one or more lens assembly connectors 250 that protrude from within a recess at an oblique angle (i.e., relative to the central axis or optical axis) from a lens assembly housing to provide a surface for contacting another connector. The protrusion can be spring biased, such that the lens assembly connectors 250 can retract as needed while applying an opposing force for enhanced engagement. For example, as shown in FIG. 10, the optical assembly can provide one or more optical assembly connectors 150 that face at an oblique angle (i.e., relative to the central axis or optical axis) from an optical assembly housing to provide a surface for contacting and/or being contacted by the one or more lens assembly connectors 250. The oblique angles can be complementary. By providing surfaces that oppose each other while facing at oblique angles, the surfaces of the connectors can be wiped with relatively transverse motion during connection and disconnection. This can help maintain the cleanliness of the surfaces. The protrusion of the optical assembly connectors 150 can be sized to fit within a recess containing the lens assembly connectors 250, so that mechanical coupling is enhanced with a fitted engagement that can be felt by the user when making the connection.

It will be understood that, in each of the examples herein, the features of the lens assembly connectors 250 can be applied to one or more optical assembly connectors 150, and the features of the optical assembly connectors 150 can be applied to one or more lens assembly connectors 250. As such, the direction of engagement can be reversed to achieve the same or similar results.

Figure 11:
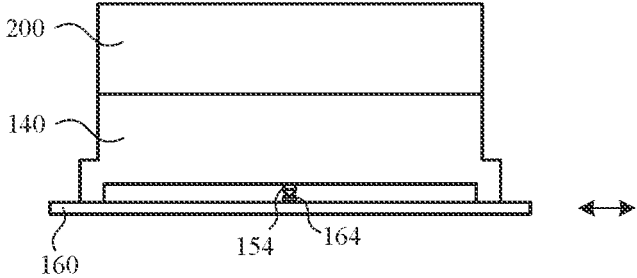
FIG. 11 illustrates an exploded perspective view of a lens assembly and an optical assembly of the head-mountable device of FIG. 1, according to some embodiments of the present disclosure.
Figure 12:
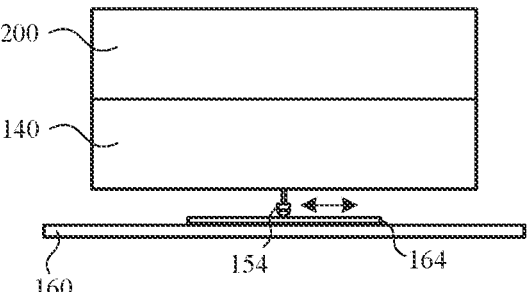
FIG. 12 illustrates a perspective view of the lens assembly and the optical assembly of FIG. 3, according to some embodiments of the present disclosure.

Referring now to FIGS. 11 and 12, the lens assembly can accommodate movement of the optical assembly as needed to accommodate a particular user.

The optical assembly 140 can move as needed (e.g., for IPD accommodation, etc.) with respect to the frame 110. As the optical assembly 140 moves, the electronic lens assembly 200 can move with the optical assembly 140 when coupled thereto. Additionally, the operable connection between the electronic lens assembly 200 and the control board 160 can be maintained throughout movement of the optical assembly 140 and the electronic lens assembly 200.

In some embodiments, as shown in FIG. 11, the electronic lens assembly 200 and the optical assembly 140 can move with the control board 160. For example, the optical assembly 140 can optionally be securely mounted to the control board 160, such that the optical assembly 140 and the control board 160 move in unison as an integrated unit. The outer optical assembly connector 154 (e.g., pogo pin) can be operably connected (e.g., by communication interface) to a control board connector 164 (e.g., contact pad) of the control board 160.

In some embodiments, as shown in FIG. 12, the electronic lens assembly 200 and the optical assembly 140 can move relative to the control board 160 while maintaining an operable connection. For example, the optical assembly 140 can be moved (e.g., via motor or other mechanism) along one or more axes with respect to the control board and/or other components of the head-mountable device. The outer optical assembly connector 154 (e.g., pogo pin) can also move with respect to the control board connector 164 (e.g., contact pad) of the control board 160. As the optical assembly 140 moves, at least a portion of the outer optical assembly connector 154 can be maintained in contact with the control board connector 164. Accordingly, an operable connection can be maintained throughout the range of motion.

It will be understood that other mechanisms can be provided to maintain operable connections throughout relative motion of the optical assembly and the control board 160. For example, the outer optical assembly connector 154 and/or the control board connector 164 can include a length of flexible and/or retractable wires that maintain a connection while allowing the components to move relative to each other. It will be understood that the engagement and operable connection between the electronic lens assembly 200 and the optical assembly 140 can optionally be maintained throughout a range of relative motion between the optical assembly 140 and the control board 160.

Figure 13:
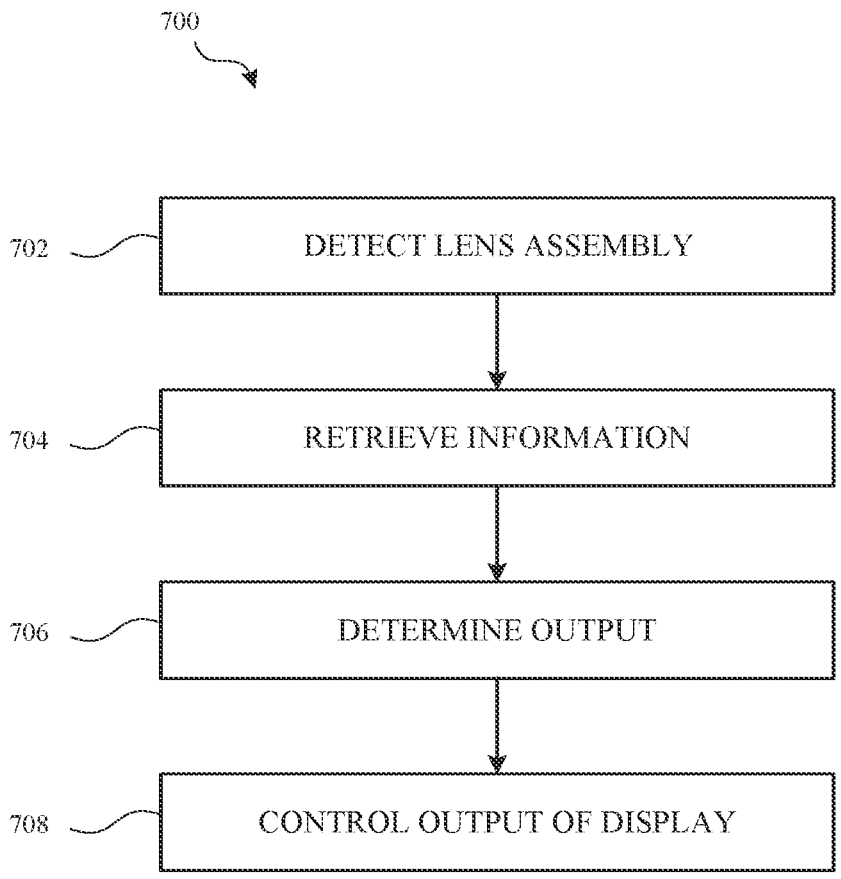
FIG. 13 illustrates a flow chart of a process including operations for controlling a head-mountable device, in accordance with some embodiments of the present disclosure.

FIG. 13 illustrates a flow diagram of an example process 700 for operating a head-mountable device with a lens assembly. For explanatory purposes, the process 700 is primarily described herein with reference to the head-mountable device 10. However, the process 700 is not limited to head-mountable device 10 or any one component thereof and one or more blocks (or operations) of the process 700 may be performed by different components of the head-mountable device and/or one or more other devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The process 700 can begin when the head-mountable device detects a lens assembly (702). Such a detection can be based on an operable connection being establish with one or more electronic components of the lens assembly. By further example, engagers can engage each other to provide a basis for the detection.

Information can be retrieved from an electronic component of the lens assembly (704). Where the electronic component comprises a memory or storage, the information can be stored thereon and provide an indicator corresponding to the lens assembly and/or a user associated therewith. The information can optionally include detections and/or measurements performed by a sensor of the lens assembly.

Based on the information, an output can be determined (706). For example, the visual output or other operation of a display can be controlled and/or altered based on the identification of a lens and/or user. It will be understood that any number of operations of the head-mountable device can be controlled based on the identification of a lens and/or user (e.g., based on user-specific settings and/or preferences).

The output of the display or other component of the head-mountable device can be controlled based on the foregoing (708). Optionally, the process 700 can be repeated as needed to detect the addition and/or removal of a lens assembly.

Figure 14:
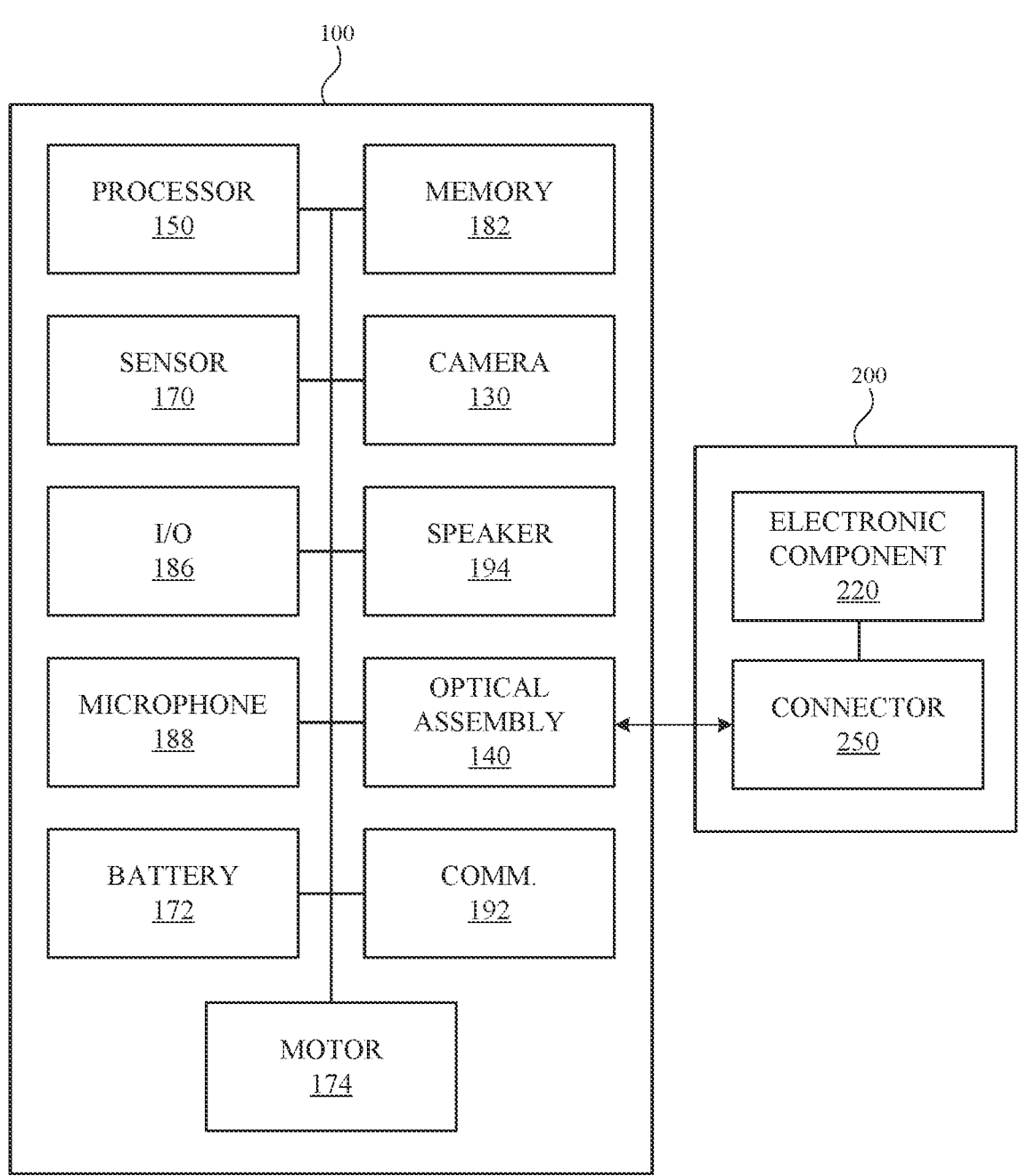
FIG. 14 illustrates a block diagram of a head-mountable device, in accordance with some embodiments of the present disclosure.

Referring now to FIG. 14, components of the head-mountable device can be operably connected to provide the performance described herein. FIG. 14 shows a simplified block diagram of an illustrative head-mountable device 10 in accordance with one embodiment of the invention. It will be appreciated that components described herein can be provided on one, some, or all of an HMD assembly, a face engagement module, a lens assembly, and/or a head engager. It will be understood that additional components, different components, or fewer components than those illustrated may be utilized within the scope of the subject disclosure.

As shown in FIG. 14, the head-mountable device 10 can include a processor 158 (e.g., control circuitry) with one or more processing units that include or are configured to access a memory 182 having instructions stored thereon. The instructions or computer programs may be configured to perform one or more of the operations or functions described with respect to the head-mountable device 10. The processor 158 can be implemented as any electronic device capable of processing, receiving, or transmitting data or instructions. For example, the processor 158 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processor can be a component of and/or operably connected to the control board and/or another component of the head-mountable device.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can include adjustment control components described herein, such as a motor 174, an actuator, and the like for moving components (e.g., optical assemblies 140) to a desired relative position and/or orientation.

The head-mountable device 10 can include one or more sensors 170, such as the sensors of a sensor assembly, as described herein.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component. 186 can include buttons, keys, or another feature that can act as a keyboard for operation by the user.

The head-mountable device 10 can include the microphone 188 as described herein. The microphone 188 can be operably connected to the processor 158 for detection of sound levels and communication of detections for further processing, as described further herein.

The head-mountable device 10 can include the speakers 194 as described herein. The speakers 190 can be operably connected to the processor 158 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery 172, which can charge and/or power components of the head-mountable device 10. The battery 172 can also charge and/or power components connected to the head-mountable device 10 (e.g., the electronic lens assembly 200).

As shown in FIG. 13, the electronic lens assembly 200 can include an electronic component 220 that is operably connected to the head-mountable device 10 through a lens assembly connector 250 and the optical assembly 140 (e.g., connector thereof). Accordingly, every component of the head-mountable device 10 can be operably connected to every component (e.g., electronic component 220) of the electronic lens assembly 200.

Accordingly, embodiments of the present disclosure provide a head-mountable device with modules that provide vision correction and operable connections between the modules. By providing head-mountable devices with modular features, certain lens assemblies can provide the desired vision correction for any given user and facilitate exchange with a different lens assembly for a different user. The lens assembly can identify itself and/or a feature thereof (e.g., vision correction and/or user identification) via an operable connection through the optical assembly onto which it attaches. By providing the operable connection through the optical assembly, part count, weight, complexity, and install procedures can be reduced. By sealing the cable providing the operable connect from an external environment, the reliability and robustness of the connection can be enhanced.

Various examples of aspects of the disclosure are described below as clauses for convenience. These are provided as examples, and do not limit the subject technology.

Clause A: a head-mountable device comprising: a control board comprising a control board connector; an optical assembly comprising: a display; and an optical assembly housing surrounding a periphery of the display; a first optical assembly connector on an outer side of the optical assembly housing; a second optical assembly connector on an inner side of the optical assembly housing; and a cable extending within the optical assembly housing between the first optical assembly connector and the second optical assembly connector; and an electronic lens assembly comprising: a lens; a lens assembly housing surrounding a periphery of the lens; and a lens assembly connector on an outer side of the lens assembly housing, wherein the electronic lens assembly is operably connected to the control board when the first optical assembly connector is connected to the control board connector and the lens assembly connector is connected to the second optical assembly connector.

Clause B: a head-mountable device comprising: an optical assembly comprising: a display; an optical assembly housing surrounding a periphery of the display and configured to releasably couple to an electronic lens assembly comprising a lens and a memory storing information corresponding to the lens assembly; and a cable sealed within the optical assembly housing; and a control board configured to be operatively connected to the memory by the cable when the lens assembly is coupled to the optical assembly, the control board being configured to control an operation of the display based on the information corresponding to the lens.

Clause C: a lens assembly for a head-mountable device, the lens assembly comprising: a lens; a lens assembly housing surrounding a periphery of the lens; a lens assembly engager; a lens assembly connector on an outer side of the lens assembly housing; and a memory storing information corresponding to the lens assembly, wherein the memory is operably connected to a control board of the head-mountable device when: the lens assembly engager engages an optical assembly of the head-mountable device, the optical assembly comprising a display; and the lens assembly connector is connected to an optical assembly connector of the optical assembly.

Clause D: a head-mountable device comprising: a control board; an optical assembly configured to move with respect to the control board, the optical assembly comprising a display; and a lens assembly configured to releasably couple to the optical assembly, the lens assembly comprising a lens, wherein the optical assembly is configured to maintain an operable connection between the control board and the lens assembly as the optical assembly and the lens assembly move relative to the control board.

One or more of the above clauses can include one or more of the features described below. It is noted that any of the following clauses may be combined in any combination with each other, and placed into a respective independent clause, e.g., clause A, B, C, or D.

Clause 1: a camera; a microphone; a speaker; a frame supporting the control board, the optical assembly, the camera, the microphone, and the speaker; and a head engager configured to secure the frame to head of a user.

Clause 2: the memory stores information including an identity of a user corresponding to the lens assembly.

Clause 3: the memory stores an indicator corresponding to the lens.

Clause 4: the electronic lens assembly comprises a sensor configured to detect a condition within the head-mountable device.

Clause 5: the electronic lens assembly comprises an antenna.

Clause 6: the electronic lens assembly comprises a light emitter.

Clause 7: the optical assembly comprises an optical assembly engager; and the lens assembly comprises a lens assembly engager configured to releasably secure the lens assembly to the optical assembly.

Clause 8: the optical assembly engager and the lens assembly engager each comprise a magnet.

Clause 9: the information includes an identity of a user corresponding to the lens assembly.

Clause 10: the information includes an indicator corresponding to the lens.

Clause 11: the optical assembly further comprises: a first optical assembly connector on an outer side of the optical assembly housing; a second optical assembly connector on an inner side of the optical assembly housing, wherein the cable extends between the first optical assembly connector and the second optical assembly connector.

Clause 12: the control board further comprises a control board connector, wherein the electronic lens assembly is operably connected to the control board through the first optical assembly connector, the second optical assembly connector, and the control board connector.

Clause 13: the optical assembly comprises an optical assembly connector; and the control board comprises a control board connector, wherein the operable connection is maintained when the optical assembly connector contacts the control board connector in one of multiple relative arrangements of the optical assembly connector and the control board connector.

Clause 14: control board connector comprises a contact pad; and the optical assembly connector comprises a pogo pin biased toward the contact pad.

Clause 15: the optical assembly comprises: an optical assembly housing surrounding a periphery of the display; and a cable sealed within the optical assembly housing, wherein the cable is configured to provide the operable connection between the control board and the lens assembly.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a control board comprising a control board connector;
an optical assembly comprising:
    a display; and
    an optical assembly housing surrounding a periphery of the display;
    a first optical assembly connector on an outer side of the optical assembly housing;
    a second optical assembly connector on an inner side of the optical assembly housing; and
    a cable extending within the optical assembly housing between the first optical assembly connector and the second optical assembly connector; and
an electronic lens assembly comprising:
    a lens;
    a lens assembly housing surrounding a periphery of the lens; and
    a lens assembly connector on an outer side of the lens assembly housing, wherein the electronic lens assembly is operably connected to the control board when the first optical assembly connector is connected to the control board connector and the lens assembly connector is connected to the second optical assembly connector.

2. The head-mountable device of claim 1, further comprising:
a camera;
a microphone;
a speaker;
a frame supporting the control board, the optical assembly, the camera, the microphone, and the speaker; and
a head engager configured to secure the frame to head.

3. The head-mountable device of claim 1, wherein the electronic lens assembly further comprises a memory that stores information including an identity corresponding to the lens assembly.

4. The head-mountable device of claim 1, wherein the electronic lens assembly further comprises a memory that stores an indicator corresponding to the lens.

5. The head-mountable device of claim 1, wherein the electronic lens assembly further comprises a sensor configured to detect a condition within the head-mountable device.

6. The head-mountable device of claim 1, wherein the electronic lens assembly further comprises an antenna.

7. The head-mountable device of claim 1, wherein the electronic lens assembly further comprises a light emitter.

8. The head-mountable device of claim 1, wherein:
the optical assembly comprises an optical assembly engager; and
the electronic lens assembly comprises a lens assembly engager configured to releasably secure the electronic lens assembly to the optical assembly.

9. The head-mountable device of claim 8, wherein at least one of the optical assembly engager or the lens assembly engager comprises at least one of a magnet, a lock, a latch, a snap, a pin, or a threaded screw.

10. A head-mountable device comprising:
an optical assembly comprising:
    a display;
    an optical assembly housing surrounding a periphery of the display and configured to releasably couple to an electronic lens assembly comprising a lens and a memory storing information corresponding to the electronic lens assembly;
    a cable sealed within the optical assembly housing;
    a first optical assembly connector on an outer side of the optical assembly housing; and
    a second optical assembly connector on an inner side of the optical assembly housing, wherein the cable extends between the first optical assembly connector and the second optical assembly connector; and
a control board configured to be operatively connected to the memory by the cable when the electronic lens assembly is coupled to the optical assembly, the control board being configured to control an operation of the display based on the information corresponding to the lens.

11. The head-mountable device of claim 10, wherein the information includes an identity corresponding to the electronic lens assembly.

12. The head-mountable device of claim 10, wherein the information includes an indicator corresponding to the lens.

13. The head-mountable device of claim 10, wherein the control board further comprises a control board connector, wherein the memory of the electronic lens assembly is operably connected to the control board through the first optical assembly connector, the second optical assembly connector, and the control board connector.

14. A lens assembly for a head-mountable device, the lens assembly comprising:
a lens;
a lens assembly housing surrounding a periphery of the lens;
a lens assembly engager;
a lens assembly connector on an outer side of the lens assembly housing;
a memory storing information corresponding to the lens assembly; and
an electronic component, wherein the electronic component is configured to be actively operated by a control board of the head-mountable device via an optical assembly connector of an optical assembly of the head-mountable device when:
    the lens assembly engager engages the optical assembly, the optical assembly comprising a display; and
    the lens assembly connector is connected to the optical assembly connector.

15. The lens assembly of claim 14, wherein the information stored by the memory further includes an identity corresponding to the lens assembly.

16. The lens assembly of claim 14, wherein the electronic component is a sensor configured to detect a condition within the head-mountable device.

17. The lens assembly of claim 14, wherein the electronic component is an antenna.

18. The lens assembly of claim 14, wherein the electronic component is a light emitter.

19. The lens assembly of claim 14, wherein the lens assembly engager comprises at least one of a magnet, a lock, a latch, a snap, a pin, or a threaded screw.

* * * * *